RADIO TRANSMITTER WITH FIXED TUNE AMPLIFIER STAGES

Filed Dec. 31, 1953 2 Sheets-Sheet 1

INVENTOR.
CLARENCE W. HANSELL
BY Charles H. Brown
ATTORNEY

July 7, 1959 C. W. HANSELL 2,894,123

RADIO TRANSMITTER WITH FIXED TUNE AMPLIFIER STAGES

Filed Dec. 31, 1953 2 Sheets-Sheet 2

INVENTOR.
CLARENCE W. HANSELL

BY Charles H. Brown
ATTORNEY

United States Patent Office 2,894,123

Patented July 7, 1959

2,894,123

RADIO TRANSMITTER WITH FIXED TUNE AMPLIFIER STAGES

Clarence Weston Hansell, Port Jefferson, N.Y., assignor to Radio Corporation of America, a corporation of Delaware Application December 31, 1953, Serial No. 401,581

3 Claims. (Cl. 250—17)

The invention relates to high power, high frequency amplifier systems. It particularly pertains to such systems for amplifying radio frequency waves under circumstances where the high frequency must be changed frequently and quickly.

In radio communications over long distances by means of the ionosphere, a serious operating problem is that of selecting and utilizing different frequencies in order to secure good transmission under the specific ionospheric conditions. The conditions of the ionosphere change from day to night every day and with the time of year, and are apparently influenced by the sunspot cycle and perhaps other factors.

Radio frequency transmitters commonly used in radio communications require the returning of the various stages in the radio frequency amplifier system whenever the transmitting frequency is changed. Most communications radio transmitters today are equipped with switching and/or automatic tuning systems to enable operation on two or more operating frequencies with a minimum of retuning. Even with this arrangement, it is found that the circuits to be switched often must be replaced or readjusted to accommodate different operating frequency selections. The switches and automatic tuning systems themselves are a frequent source of trouble, and furthermore the multiplicity of circuit elements makes it far more difficult to suppress spurious oscillations. These troubles due to frequency switching have proved to be so serious that there are great operating advantages in eliminating the switching and automatic tuning systems and instead providing a greater number of transmitters or of duplicating the radio frequency portions of them with only the power supply portions being used at all frequencies. The cost of either automatic tuning systems or duplicate transmitters tends to make modernization of communications radio stations prohibitive.

Accordingly, it is an object of the invention to provide a transmitter capable of rapid and convenient change of frequency without retuning the intermediate stages of the radio frequency amplifier.

It is a further object of the invention to provide a single transmitter readily operable at a number of radio frequencies to enable economic utilization of the different frequencies under the different ionospheric conditions.

It is another object of the invention to provide a novel radio frequency system wherein the frequency of the output wave of relatively high power can be controlled in synchronism with an input wave of relatively low power.

It is an ancillary object of the invention to provide a novel radio frequency transmitter employing multiple modulation and utilizing an amplifier capable of both linear and non-linear amplification in which there is amplitude limiting in all, or many of the amplifying stages.

Briefly, in accordance with the invention there is provided a radio frequency amplifier of appropriate power gain, the circuits of which are fixed tuned to a frequency much higher than the operating output frequency. This higher frequency will be referred to throughout the specification and claims as the ultra frequency. Radio frequency power is generated by a known arrangement at the ultra frequency to which the amplifier circuits are tuned. The ultra frequency power is keyed or modulated at a lower frequency containing the intelligence to be transmitted and corresponding to the desired operating frequency. For amplifying amplitude modulation signals, the intelligence wave, which may be an on-and-off tone signal, a voice wave, or any other variable amplitude signal, is used to modulate the output from a radio frequency oscillator which is tuned to the desired operating frequency in the normal manner. This modulated operating frequency wave is then utilized to key or modulate the ultra frequency current to produce pulses spaced apart in time proportional to the instantaneous modulated wave frequency. The modulated ultra frequency pulse wave is then amplified in the fixed tuned ultra frequency amplifier to the desired power level. The modulated ultra frequency current is then rectified or detected and the resultant wave applied to a filter tuned to the desired operating frequency which is equal to the modulated radio frequency or a harmonic thereof. In the same manner, the ultra frequency current oscillations may be modulated by a frequency or phase modulated signal.

Linear amplification of a given electric wave is preferably accomplished by modulating the ultra frequency oscillator output currents in frequency or phase, amplifying the frequency or phase modulated wave to the desired power level, and then demodulating in frequency or phase to obtain the original waveform in effect. The rectified currents because of their more or less rectangular waveform will contain a series of frequencies which are harmonically related. A frequency selective filter, which may be a simple tuned output circuit, is employed to pass only one, usually only the lowest, of the frequency components to any substantial degree. However, a higher harmonic or more than one frequency may be passed if desired.

In order that the invention may be more clearly understood and readily put to practical use, a circuit arrangement embodying the invention is hereinafter described, by way of example only, with reference to the accompanying drawings in which.

Figure 1:
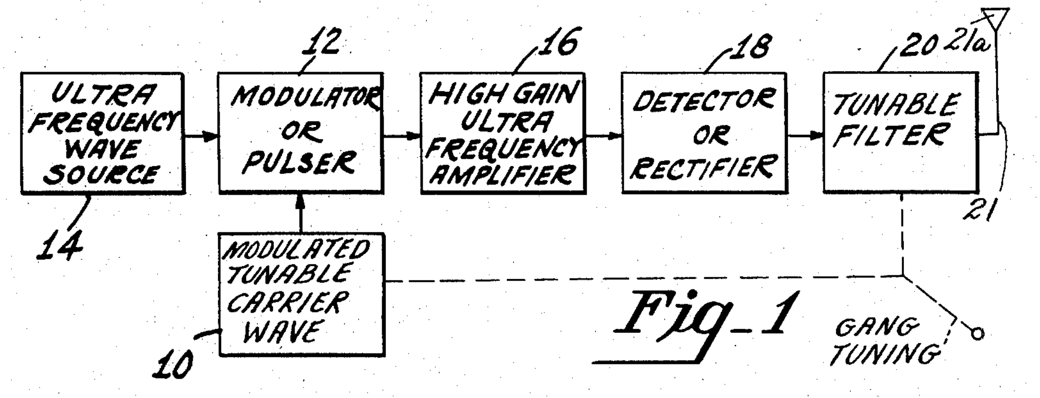
Fig. 1 is a functional diagram of a circuit arrangement according to the invention.

Referring to Fig. 1, the basic elements of a circuit arrangement according to the invention are shown in functional form. The source of current to be amplified 10 is coupled to a modulator or pulser circuit 12 for modulating oscillations obtained from a source of ultra frequency waves 14. The modulated ultra frequency oscillations are applied to a high gain, high power amplifier 16 fixed tuned to the ultra frequency. A detector or rectifying circuit 18 is connected to the ultra frequency amplifier 16 in order to recover the modulation components and a filter network 20 is coupled to the detector 18 to eliminate undesired harmonics of the modulation components and further suppress any ultra frequency components, and deliver at the output connection 21 a reproduction of the wave to be amplified at a considerably higher energy level. As an example, the output from connection 21 can be passed on to an antenna 21*a*, for example, for radiating the intelligence to a remote receiving station. Further according to the invention, the source 10 of current to be amplified and the output filter network 20 contain elements which may be tuned to more than one operating frequency, whereas, the ultra frequency wave source 14, the modulator or pulser circuit 12, the amplifier 16 and the input circuit of the detector or rectifier 18 are fixed tuned to the ultra frequency. A common adjusting means 10*a* is schematically shown for varying the tuning of the carrier from the sources 10 and the tuning of the filter 20. As examples, the currents to be amplified may be in such forms as the following:

(*a*) A continuous current at the desired output frequency, or a sub-harmonic of that frequency, which may be utilized in low frequency radio or industrial applications where continuous wave power is desired;

(*b*) A sine wave at the desired output operating frequency, or a sub-harmonic of that frequency, which is keyed on and off in accordance with telegraph signals;

(*c*) A sine wave at the desired output frequency, or a sub-harmonic of that frequency, which is phase or frequency modulated by signalling currents, such as a broadcast program, having voice or picture signals, tone signals, or facsimile signals, and the like;

(*d*) A rectangular wave which varies in phase or frequency or in width of pulses in accordance with a signalling current.

While the system according to the invention will provide reasonably faithful reproduction of the input wave with an ultra frequency twice the frequency of the highest frequency to be amplified, better results will be obtained if the ultra frequency is much higher so that smaller percentage frequency bandwidths are required in the ultra frequency circuits and so that the problems of filtering and waveform distortion are reduced. As a rule, it is contemplated to use an ultra frequency at least five and up to about twenty times the frequency of the highest frequency components of the currents to be amplified. For radio communication service within the operating frequency band of 3 to 30 megacycles, the ultra frequency is preferably of the order of 300 to 600 megacycles. At the present time vacuum tube amplifiers of the desired power ratings recently became available to operate in this 300–600 megacycles frequency range. Investigation has indicated that good results can be obtained for radio telegraph service with a frequency ratio as low as 4:1 but only at the price of lowered efficiency and lowered gain per stage in the ultra frequency amplifier. For many industrial applications where more power is desired and the operating frequency employed is lower, the ultra frequency may lie in the range of 30 megacycles or even less. With high power circuitry such as full color TV transmitting equipment for example, now being developed for use at frequencies as high as 1000 megacycles, no difficulty is foreseen with respect to the construction of a suitable ultra frequency amplifier for use according to the invention as part of the equipment designed to provide a final output operating frequency up to 1000 megacycles and higher.

The oscillations from the ultra frequency wave source 14 are keyed or modulated on and off in modulator 12 by the wave to be amplified as delivered by the source of currents 10. The output of the modulator 12 comprises pulses of current with a mid-frequency corresponding to that of the ultra frequency oscillations which are repeated at the repetition rate or the recurrence frequency of the wave to be amplified. The pulse wave output from this modulator 12 is at a relatively low power level. The pulse wave is then amplified in the amplifier 16, which will normally be a multistage amplifier chain which is fixed tuned throughout at the frequency of the ultra frequency oscillations. It will raise the relatively low power level pulse wave input up to a relatively high power level. It is contemplated that output waves in excess of 10 kilowatts will be produced in response to an input wave of the order of a single watt.

The detector or rectifier 18 to which the high power pulses of carrier wave are applied may be simply a diode rectifier providing D.C. output pulses at the frequency of the input wave to be amplified. These pulses are then filtered to provide a final alternating current power output at the desired operating frequency. Preferably, the rectifier or detector 18 comprises a triode or multigrid amplifier tube biased to pass anode current only in response to current pulses applied by the ultra frequency amplifier 16. In general, however, the selection of rectifying means depends upon weighing various operating and design problems to arrive at some broad optimum of results, taking into account the type of operation intended, cost, efficiency, and other factors.

The output of the rectifier 18 is applied to a low-pass or a band-pass filter 20 to eliminate the ultra frequency components and undesired harmonics of the amplified currents in a manner similar to that employed in conventional equipment. The amplified signal is then applied to the utilization circuit, such as an antenna in the case of a radio transmitter or a radio frequency heating device, or any other desired type of load.

In the case of a radio transmitter according to the invention, the only tuning operations required to change the operating frequency are in the source 10 of radio frequency currents and the filter 20 and/or antenna coupling stage. Tuning of the intermediate amplifier stages is unnecessary because they are operated at the ultra frequency which is not changed by changing the frequency of the source of currents to be amplified. Thus all of the extremely difficult problems associated with changing frequency in the intermediate amplifier stages, including the suppression of spurious oscillations for which different means are required at different frequencies, are avoided.

Figures 2, 4:
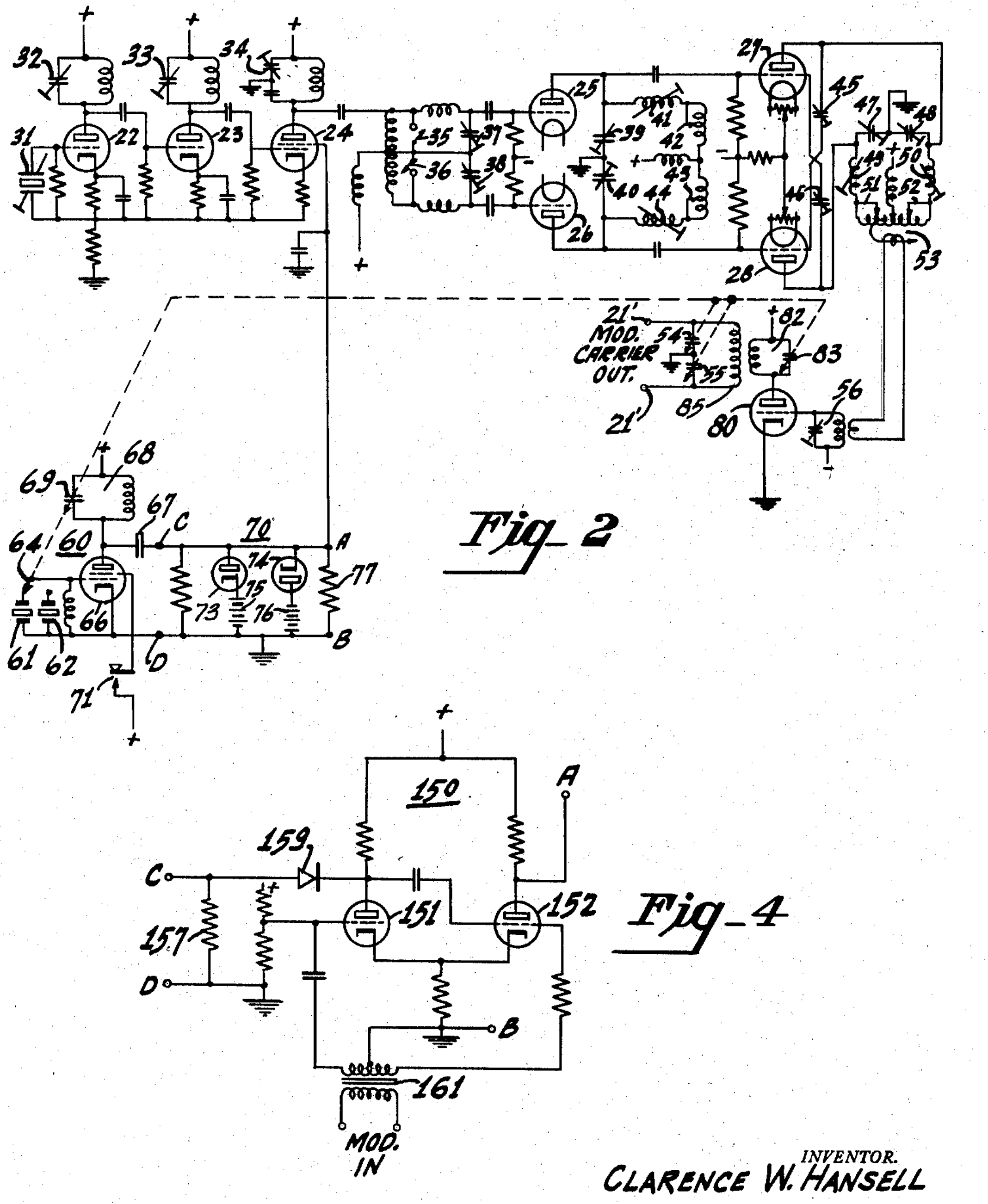
Fig. 2 is a schematic diagram of a circuit arrangement of one suggested embodiment of the invention.
Fig. 4 is a schematic diagram of alternate circuitry that can be used in either of the arrangements shown in Figs. 2 and 3.

The embodiment of the invention shown in Fig. 2 provides an example of the problem to be overcome, as well as an example of circuitry for carrying out the invention. The tubes 22—28 and the associated components comprise the A.C. circuitry of a known 10 kilowatt C.W. telegraph communications transmitter of very recent manufacture. This transmitter was designed for operation at any frequency between 3.75 and 30 megacycles and was especially designed for a minimum of tuning controls for changing frequency as well as a minimum of stages of amplification, which latter factor inherently increases the efficiency and reduces the number of adjustments necessary. This transmitter, however, requires the adjustment of twenty-five controls 31–55, including the change or adjustment of the crystal 31; the low power variable capacitors 32—34, 37—40, the neutralizing capacitors 45 and 46, the final tank tuning capacitors 47 and 48 and the antenna tuning capacitors 54 and 55; the switches 35 and 36, the taps 42, 43, 51 and 52; the variable inductors 41, 44, 49 and 50 and the link coupler 53. It is obvious that considerable time is required to realign this modern transmitter for operation on a different frequency. An automatic tuning system employing a system similar to those suggested by U.S. Patent 2,574,603 to Erich J. Uhlig, and U.S. Patent 2,574,604 to Wm. D. La Rue can be used for a limited number of preset frequencies but the cost of twenty-five expensive control mechanisms is not at all attractive, and as has been indicated, spurious oscillations are a problem as the frequency is varied.

According to the invention, the number of tuning controls that must be adjusted can be reduced to relatively few. In the example shown in Fig. 2 only five controls, including the antenna tuning capacitors 54 and 55 of the former arrangement are needed. It is especially noteworthy that, according to the invention, the same number, give or take one or two, of controls will be required for 100 kw. or more as shown here for only 10 kw. The crystal 31 and the capacitors 32 to 34 are initially adjusted to resonate the circuits associated with the tubes 22—24, which may be frequency multipliers, to produce oscillations at the anode of the tube 24 at the ultra frequency. The tube 22 may be oscillating at the ultra frequency or preferably, at a sub-harmonic thereof as desired. The remainder of the controls 35—53 and a further tank circuit 56 are adjusted in conjunction with the associated circuitry to resonance at the ultra frequency. At the present time lumped inductance and capacitance circuitry is readily constructed for operation up to 60 megacycles and somewhat higher, tuned line circuits not being clearly established as the best type below 100 megacycles. Thus the circuit arrangement shown is practical for use according to the invention at operating frequencies up to 15 megacycles for C.W. telegraphy and up to 6 megacycles for other services.

A carrier wave generating circuit 60 is provided in the form of a crystal controlled oscillator having a plurality of crystals 61, 62 selectively connected by a switch element 64 to the grid of an oscillator tube 66. A resonant network 68 connected in the anode circuit of the oscillator tube 66 is tuned to the operating carrier frequency, or a sub-harmonic thereof, by a variable capacitor 69.

As shown the oscillator tube 66 is a tetrode and oscillations are keyed by means of a hand operated key 71 in the screen grid circuit. The contact of the hand key may of course be replaced by the contacts of any of the automatic telegraph keys commonly used, for example the Boehme keyer which closes contacts in response to the passage of a paper tape punched in accordance with the desired text to be transmitted. Obviously a triode or any other oscillator tube may be used in a known circuit arrangement and other modulating means may be used, the circuitry shown being but one example. It is to be understood, of course, that, while the oscillator itself may be keyed or otherwise modulated, it is preferable to key or modulate a following stage such as a buffer, frequency multiplier or the like.

The carrier wave from the oscillator tube 66 has a nearly sinusoidal wave shape whereas it is desirable to deliver a wave of the same base frequency but having a rectangular wave shape to an input electrode of tube 24. It is desirable because the currents passed through the ultra frequency amplifier chain to rectifier tube 80 should be completely on or completely off, at any one time in order that the ultra frequency amplifier may function at high power efficiency and greatest stability. In converting the sinusoidal waves to rectangular waves a number of devices are available, but in the arrangement shown in Fig. 2 the sinusoidal wave is applied to the input circuit of a clipping circuit 70 comprising a pair of diodes 73 and 74 which are biased by potentials, shown as obtained from batteries 75 and 76 respectively, which are adjusted to clip each half of the wave independently to provide the required steep transitions across the output load resistor 77. Obviously the parallel clipping circuit 70 may be replaced by a series clipping circuit which may have a commond diode bias circuit for simultaneous adjustment of the clipping levels. Of course, amplification may be inserted before and after clipping in order to present the required modulating level to the tube 24 and an overdriven amplifier may be used to provide both amplification and clipping, although the waveform is apt to be less sharp than might be desired.

The wave presented across the output load resistor 77 carries keying and carrier components which are applied to a grid electrode of the ultra frequency translating tube 24. The output of this tube 24 is in the form of ultra frequency oscillations modulated in amplitude by carrier frequency pulsed at the keying rate. These pulses are amplified by the tubes 25—28 to an average power level varying from zero to a value somewhat greater than the required output level—to allow for some inefficiency in the following circuits.

The circuit 56 is fixed tuned to the ultra frequency and is coupled to the rectifier or detector tube 80. The grid of this tube 80 is biased so that the tube passes current only when ultra frequency pulse currents are present in circuit 56, thus providing rectification plus some amplification. Tube 80 may, of course, be replaced by two or more tubes in parallel, if desired. The ultra frequency components are suppressed in a tuned tank circuit 82 connected in the anode lead of the rectifier tube 80. The capacitor 83 is adjusted to provide parallel resonance at the operating frequency, establishing a high impedance load circuit across which a large amplitude modulated carrier wave is developed, and providing a low impedance path to ground insofar as the ultra frequency components are concerned. A low impedance path is also provided for multiples of the output frequency, which are to be suppressed.

A coil 85 is coupled to the tank circuit 82 and tuned by means of the capacitors 54 and 55 to the operating frequency whereby the high power modulated carrier wave is transferred to the antenna or other utilization device by way of the terminals 21′, 21′. As shown, a balanced output is provided with two antenna tuning capacitors 54, 55 having grounded rotors. These capacitors may have separate shafts or may be ganged depending on the actual conditions. Ganging is shown by the broken line only to indicate that all of the adjustable units may be controlled simultaneously by an automatic tuning system as disclosed in the aforementioned Uhlig and La Rue patents. It is obvious that one or more of the controls might be ganged under certain conditions so that fewer automatic shaft positioning mechanisms, which are relatively expensive and often somewhat demanding in transmitter layout, are needed. As an example of what can be done, it is suggested that the crystal switch element 64 be ganged with the automatic tuning selector switch and the capacitors 54 and 55 ganged to the same preset mechanism, whereby the complete control of a 10 or 100 kw. transmitter is accomplished with only three preset tuning mechanisms.

It is a decided advantage that the arrangement according to the invention lends itself to mass production of high power amplifiers for a number of services. The ultra frequency amplifier can be standardized to a high degree. Properly shielded aural ultra frequency amplifiers of great power handling capability can be operated in the same room. Also, the tuned elements may be large fixed elements with small trimmer elements in series or parallel, cutting both size and cost at the same time.

Figure 3:
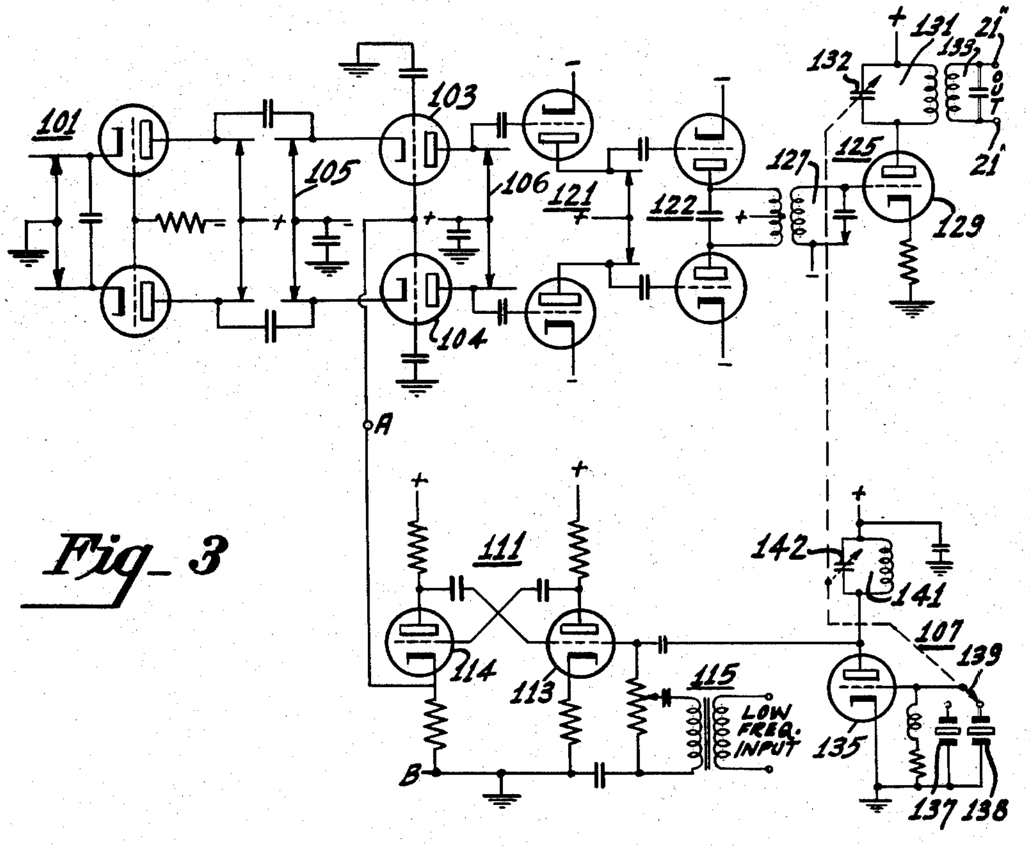
Fig. 3 is a schematic diagram of another embodiment of the invention.

Fig. 3 illustrates a particular pulsing arrangement for applying several different kinds of signal modulation to a radio transmitter, particularly using ultrahigh frequency techniques for carrying out the invention. An ultra frequency oscillator 101, or some other primary source of ultra frequency oscillations, is coupled to the cathodes of a pair of amplifier tubes 103, 104 in push-pull or out-of-phase relation. In the arrangement shown, the cathodes are coupled in push-pull relation by being directly connected to the opposite sides of a resonant line. The resonant line is tuned to the frequency of the ultra frequency oscillations by means of a contacting slider 105. The anodes of the amplifier tubes 103, 104 are also coupled in push-pull or out-of-phase relation. The tuning means for the anode circuit is also a resonant line, tuned to the frequency of the ultra frequency oscillations by means of a slider 106. In practice, the resonant cathode and anode circuits usually will be shielded by enveloping electrical conductors, to reduce unwanted radiation and unwanted couplings between circuits. The parallel conductor tuning system shown, however, is illustrative of the type of tuning that is the simplest to employ at frequencies over 100 megacycles in applications of the invention.

The modulated radio frequency wave at the desired output operating frequency is applied in parallel to the grids of the amplifier tubes 103, 104 which tubes serve as the modulator tubes. The type of signal which may be applied to the grids of the ultra frequency modulator tubes may be, for example, any of the types of current to be amplified set forth above in the description of Figs. 1 and 2. The voltage impressed on the grids of the modulator tubes in parallel produces balanced amplitude modulation of the ultra frequency signal.

A circuit arrangement for supplying several different types of modulation to the grids of the modulator tubes is also shown in Fig. 3. A carrier wave generating circuit 107, or other source of radio frequency currents at the desired operating frequency, may be modulated by voice or tone signals in the usual manner, or may be utilized as shown in Fig. 3 to trigger an astable reciproconductive circuit 111, sometimes called a multivibrator, comprising the tubes 113, 114. As employed herein, the term "reciproconductive circuit" is construed to include all two tube regenerative circuit arrangements in which conduction alternates with rectangular waveforms in one or the other tube. The sinusoidal input from the oscillator 107 serves to synchronize, or determine the operating frequency of the multivibrator 111. The oscillator 107 and the reciproconductive circuit 111, therefore, function to produce rectangular waves or pulses repeated at a constant rate equal to the final operating output frequency desired for the whole transmitter. However, the duration of each pulse of the rectangular waves from the reciproconductive circuit 111, with respect to the constant frequency sinusoidal waves from oscillator 107, is variable in response to modulation potentials. Modulation potentials applied to the input of a transformer 115 and thence to the grid of the input tube 113 tend to alter the time of triggering of the reciproconductive circuit 111 so that the wave at the cathode of the follower tube 114 carries the modulation components as well as the carrier components in the form of pulse length modulation of the carrier currents. The pulse length modulated wave is then applied to the control grid of the tubes 103, 104 to make it pass pulses of ultra frequency oscillations repeated at a rate equal to the repetition rate of the output pulses from the reciproconductive circuit 111.

The ultra frequency oscillations which are modulated by the radio frequency signals at the desired operating frequency are then amplified in a high gain, high efficiency, fixed tuned amplifier to a little above the final output power level. The high gain fixed tuned amplifier may be, for example, constituted by a number of push-pull Class C amplifiers. Two such stages 121, 122 are shown in Fig. 3, but it is to be understood that a greater number of individual stages may be used or a single stage of amplification with very high gain and sufficient power output might be substituted for the amplifier shown. A travelling wave tube amplifier is also suggested for such an application.

In the final stage, rectification or detection of the ultra frequency is necessary to produce the output currents at the desired operating carrier frequency. An amplifying anode rectifier stage 125 is shown. A fixed tuned ultra frequency input circuit 127 is connected to the grid of a power amplifier tube 129 and an output circuit 131 connected to the anode of the power amplifier tube 129, the tuning of the output circuit 131 is adjusted to the desired output operating frequency and the load element presented at the terminals 21″, 21″ is coupled to the output tank circuit 131 by any known means, such as the tuned link 133 shown.

The amplifying anode rectifier 129, also called an anode power detector, has the grid bias of value approximating the cut-off value of the tube 129. Upon application of the amplified modulated ultra frequency signal to the grid of the amplifying anode rectifier 129, anode current impulses which have an average value that varies in accordance with the modulating wave will flow. The modulating wave in this case is the alternating current at the desired output frequency having any of the several types of modulation previously impressed thereon as explained above in connection with Figs. 1 and 2.

The output circuit 131 which is tuned to the desired output frequency offers a high impedance to the modulation frequency, that is the desired operating frequency currents. The same circuit 131 offers a very low impedance, thereby imparting a filtering action, to the ultra frequency components and to undesired multiples of the output frequency.

As shown in Fig. 3, the carrier frequency wave generating circuit 107 comprises a tube 135 to the grid circuit of which a plurality of crystals 137,138 are selectively connected by means of a switch element 139 and in the anode circuit of which there is a resonant circuit 141 tuned by the variable capacitor 142 to the desired operating frequency, or a sub-harmonic thereof. The capacitors 132,142 and the switch element 139 may be separately tuned or coupled as indicated for simultaneous adjustment by means of an automatic tuning system such as previously mentioned in connection with the embodiment of the invention illustrated in Fig. 2.

The high power amplifier system according to the invention is not limited to the circuitry thus far described and illustrated. For example, in the arrangement of Fig. 2 the clipping circuit 70 and in Fig. 3 the multivibrator 111 may be replaced by any one of a number of known circuit arrangements by means of which pulses of constant length are produced at an average frequency equal to the frequency of the carrier wave sources 60 or 107 but which are modulated in phase and frequency around the average values in response to the modulation input. Thus, the amplifying system of the invention may be utilized to accomplish pulse phase or pulse timing modulation.

A frequency shift telegraph signalling transmitter may be had by modifying the arrangement shown in Fig. 2. The oscillator 60 is disconnected and the output of a frequency shift exciter is connected to the input terminals C and D of the clipping circuit 70. One such frequency shift exciter is described and illustrated in U.S. Patent 2,492,795, issued December 27, 1949 to Hallan E. Goldstine. Another frequency shift exciter suggested for such use is that described and illustrated in U.S. Patent 2,600,248, issued June 10, 1952 to Leonard R. Kahn and Walter Lyons. The arrangement then becomes a frequency modulation or FM transmitter. It may be used for FM transmission of any type of telegraph or other signal or modulation for which the equipment is designed. Telemetering problems should find ready solutions in a circuit according to the invention. A particularly useful application is for long distance radio telegraphy via the ionosphere, at frequencies in the range of 3 to 30 megacycles.

The arrangements of Figs. 2 and 3 may be adapted for high power amplitude modulation by modulating or varying the high direct voltage potential supplied between the anodes and cathodes of the final amplifier tubes 27 and 28. High level modulation of an R.F. wave is readily accomplished by known circuitry developed for the purpose.

Single side band transmission may be obtained by replacing the oscillator 60 of Fig. 2 with the output of a single side band modulator, and using rectified current from the same single side band modulator to amplitude modulate the output from the final tubes 27 and 28. Thus, an asymmetrical or pseudo-single side band modulated output is obtained from terminals 21′. In this case the phase of the output from the single side band modulator is maintained through the circuits shown although amplitude variations are removed. The amplitude variations are then reinserted via the amplitude modulator at a higher power level, thus making the transmitter output simulate the single side band modulator output, but at a higher power level. This system is described in the copending U.S. patent application, Serial No. 242,061, filed August 16, 1951 on behalf of L. R. Kahn, now Patent No. 2,666,133, issued January 12, 1954. The system has been found useful in multichannel long distance radio telegraphy.

A more practical system of single side band transmission is obtainable in a system employing my invention if the oscillator 60 and the limiting circuit 70 are replaced by a single side band modulator, and the ultra frequency amplifiers comprising tubes 24—28 are biased and adjusted to provide nearly linear amplification. Ordinarily, the single side band modulator will include heterodyning stages by means of which the frequency range of the output currents can be varied as desired. When the frequency is varied there is of course no need to retune the ultra frequency circuits and frequency change in the transmitter as a whole is simplified.

Referring to Fig. 4, there is shown a circuit comprising a monostable reciproconductive circuit 150 having two tubes 151, 152 which can be used to replace the clipping circuit 70 of the arrangement of Fig. 2 or the astable reciproconductive circuit 111 of the arrangement of Fig. 3. The oscillator 60 in the arrangement of Fig. 2 through the coupling capacitor 67 and the input resistor 157 of Fig. 4 delivers pulses to the anode of the input tube 151 to initiate a square wave or recurrence frequency equal to the carrier frequency as measured by the front edges of the pulses. Amplitude modulating potentials applied to the transformer 161 and thence to the grids of both tubes 151 and 152 in opposition tend to alter the restoring time of the monostable reciproconductive circuit. The anode of the follower tube 152 thus carries the modulation components as well as the carrier components for application to the control grid of the ultra frequency translating tube 24. Short pulses of ultra frequency oscillations having the leading edges recurring at carrier frequency rate and the trailing edges following the respective leading edges at a time proportional to the amplitude of the modulation applied to the transformer 161 are amplified in the fixed tuned ultra frequency amplifier. The amplified pulses are then demodulated to derive the high level reproduction of the input wave as described above in connection with the embodiments shown in Figs. 1, 2 and 3.

The invention claimed is:

1. A transmitter comprising the following components all located adjacent each other at a common transmitting site: a source of carrier frequency waves, means for modulating said waves in accordance with intelligence to be transmitted, to thereby produce a modulated carrier frequency wave, a source of waves of a frequency substantially higher than said carrier frequency, a modulation circuit receptive of said modulated carrier frequency wave and of waves from the last-mentioned source and operating to modulate said modulated carrier frequency wave onto the higher frequency wave, an amplifier fixed-tuned to the frequency of said last-mentioned source and connected to the output of said modulation circuit, a detector circuit connected to the output of said amplifier to demodulate the output of said amplifier so as to derive said modulated carrier frequency wave, a tunable filter network connected to the output of said detector circuit to pass only multiples, including unity, of frequencies found in said modulated carrier frequency wave, terminals connected to the output of said tunable filter network for transferring such output to a transmitting antenna, and common means for adjusting the frequency of said first-named source and for varying the tuning of said filter network.

2. A transmitter comprising the following components all located adjacent each other at a common transmitting site: a source of carrier frequency waves, means for amplitude modulating said waves in accordance with intelligence to be transmitted, to thereby produce an amplitude modulated carrier frequency wave, a source of waves of a frequency substantially higher than said carrier frequency, an amplitude modulation circuit receptive of said amplitude modulated carrier frequency wave and of waves from the last-mentioned source and operating to amplitude modulate said modulated carrier frequency wave onto the higher frequency wave, an amplifier fixed-tuned to the frequency of said last-mentioned source and connected to the output of said amplitude modulation circuit, a detector circuit connected to the output of said amplifier to demodulate the output of said amplifier so as to derive said modulated carrier frequency wave, a tunable filter network connected to the output of said detector circuit to pass only multiples, including unity, of frequencies found in said modulated carrier frequency wave, terminals connected to the output of said tunable filter network for transferring such output to a transmitting antenna, and common means for adjusting the frequency of said first-named source and for varying the tuning of said filter network.

3. A transmitter comprising the following components all located adjacent each other at a common transmitting site: a source of carrier frequency waves, means for amplitude modulating said waves in accordance with intelligence to be transmitted, to thereby produce an amplitude modulated carrier frequency wave, a source of waves of a frequency substantially higher than said carrier frequency, an amplitude modulation circuit receptive of said amplitude modulated carrier frequency wave and of waves from the last-mentioned source, said circuit being constructed and arranged to operate as an on-off keyer, producing pulses of said substantially higher frequency waves at a recurrence or repetition rate proportional to the instantaneous amplitude of said modulated carrier frequency wave; an amplifier fixed-tuned to the frequency of said last-mentioned source and connected to the output of said amplitude modulation circuit, a detector circuit connected to the output of said amplifier to demodulate the output of said amplifier so as to derive said modulated carrier frequency wave, a tunable filter network connected to the output of said detector circuit to pass only multiples, including unity, of frequencies found in said modulated carrier frequency wave, terminals connected to the output of said tunable filter network for transferring such output to a transmitting antenna, and common means for adjusting the frequency of said first-named source and for varying the tuning of said filter network.

References Cited in the file of this patent

UNITED STATES PATENTS

| | | |
|---|---|---|
| 1,984,451 | Bailey | Dec. 18, 1934 |
| 2,085,125 | Shaw | June 29, 1937 |
| 2,233,183 | Roder | Feb. 25, 1941 |
| 2,287,862 | Brian | June 30, 1942 |
| 2,290,553 | Haantjes | July 21, 1942 |
| 2,309,481 | Summerhayes | Jan. 26, 1943 |
| 2,398,694 | Case | Apr. 16, 1946 |
| 2,455,332 | Hare | Nov. 30, 1948 |
| 2,498,078 | Harrison | Feb. 21, 1950 |
| 2,524,165 | Freedman et al. | Oct. 3, 1950 |
| 2,557,697 | Schmitt | June 19, 1951 |
| 2,678,383 | Frantz | May 11, 1954 |

FOREIGN PATENTS

| | | |
|---|---|---|
| 620,444 | Great Britian | Mar. 24, 1949 |